(12) United States Patent
Qu

(10) Patent No.: US 9,046,280 B2
(45) Date of Patent: Jun. 2, 2015

(54) SOLAR ENERGY COLLECTOR WITH COMPREHENSIVE EFFECTS

(75) Inventor: Lei Qu, Suzhou (CN)

(73) Assignee: Suzhou Dongling Vibration Test Instrument Co., Ltd. (CN)

(*) Notice: Subject to any disclaimer, the term of this patent is extended or adjusted under 35 U.S.C. 154(b) by 19 days.

(21) Appl. No.: 13/395,404

(22) PCT Filed: Sep. 9, 2010

(86) PCT No.: PCT/CN2010/076751
§ 371 (c)(1),
(2), (4) Date: Mar. 9, 2012

(87) PCT Pub. No.: WO2011/029396
PCT Pub. Date: Mar. 17, 2011

(65) Prior Publication Data
US 2012/0167953 A1 Jul. 5, 2012

(30) Foreign Application Priority Data
Sep. 9, 2009 (CN) .......................... 2009 1 0035040

(51) Int. Cl.
*H01L 31/058* (2006.01)
*F24J 2/04* (2006.01)
(Continued)

(52) U.S. Cl.
CPC .............. *F24J 2/4647* (2013.01); *F24J 2/4614* (2013.01); *Y02B 10/20* (2013.01); *Y02B 10/70* (2013.01);
(Continued)

(58) Field of Classification Search
CPC .............. H01L 31/058; H01L 31/0583; H01L 31/0521; F24J 2/4647; F24J 2/5232; F24J 2/4614; H02S 40/40; H02S 40/44; E03B 3/00; E03B 3/02; E03B 3/03
USPC ......................................... 138/248
See application file for complete search history.

(56) References Cited

U.S. PATENT DOCUMENTS 6,263,618 B1* 7/2001 Jones ................................ 52/12
2003/0010378 A1* 1/2003 Yoda et al. .................... 136/251
(Continued)

FOREIGN PATENT DOCUMENTS

| CN | 101013733 | 8/2007 |
|---|---|---|
| CN | 201290077 | 8/2009 |
| DE | 19515366 | * 2/1996 |

OTHER PUBLICATIONS

Machine translation of DE 19515366; Sep. 17, 2013.*
Derwent Translation of Abstract for German Publication DE 19515366; Sep. 17, 2013.*
International Search Report, PCT/CN2010/076751, Dec. 16, 2010.

*Primary Examiner* — Jeffrey T Barton
*Assistant Examiner* — Edward Schmiedel
(74) *Attorney, Agent, or Firm* — Matthew A. Pequignot; Pequignot + Myers LLC

(57) ABSTRACT

A solar energy collector with comprehensive effects. The collector is mounted on a mounting surface (5) of a building or the ground. The collector includes an external controller (4) and a support frame (13) disposed on the mounting surface. Windshields (21) with air openings (22) are disposed around the support frame (13). An energy collecting unit comprises a pipeline system disposed on underside of the support frame (13) and modularized energy collecting boards disposed on upper-side of the support frame. A water collecting unit comprises a modularized water collecting slot (31), a water collecting pipe (32) and a water collecting tank (33) that are disposed under or beside the support frame (13). An energy store unit comprises an insulation water tank and an electrical energy store system. The functions of solar power photovoltaic generation, water heating by solar energy, buildings insulation and rainwater collection can be achieved.

10 Claims, 8 Drawing Sheets

(51) Int. Cl.
*F24J 2/46* (2006.01)
*H01L 31/042* (2014.01)
*H02S 40/44* (2014.01)
*F24J 2/52* (2006.01)

(52) U.S. Cl.
CPC  *Y02E 10/40* (2013.01); *Y02E 10/50* (2013.01); *Y02E 10/60* (2013.01); *F24J 2/5232* (2013.01); *Y02B 10/10* (2013.01); *H02S 20/00* (2013.01); *H02S 40/44* (2014.12)

(56) References Cited

U.S. PATENT DOCUMENTS

| | | | |
|---|---|---|---|
| 2003/0154680 A1* | 8/2003 | Dinwoodie | 52/519 |
| 2003/0178349 A1* | 9/2003 | Bacon et al. | 210/94 |
| 2008/0302357 A1* | 12/2008 | DeNault | 126/704 |
| 2009/0095339 A1* | 4/2009 | Nightingale | 136/244 |

\* cited by examiner

US 9,046,280 B2

SOLAR ENERGY COLLECTOR WITH COMPREHENSIVE EFFECTS

RELATED APPLICATION DATA

This application is the national stage entry of International Appl. No. PCT/CN2010/076751, filed Sep. 9, 2010, which claims priority to Chinese Patent Application No. 200910035040.9, filed Sep. 9, 2009. All claims of priority to these applications are hereby made, and each of these applications is hereby incorporated in its entirety by reference.

TECHNICAL FIELD

The present invention relates to a device for comprehensive utilization of solar energy, and more particularly, to a solar energy collector with comprehensive effects, which can realize four energy-conservation effects of solar power photovoltaic generation, water heating by solar energy, buildings-insulation and rainwater collection.

BACKGROUND OF THE INVENTION

Energy-conservation and utilization of solar energy are new trends of the development of the world. Currently, various related technologies and products are increasing, but the cost and the efficiency have been bottlenecks of energy-conservation and utilization of solar energy. There exist the following particular problems:

Firstly, the solar water heater has been widely used, but its cost is very high. What's more, the higher the efficiency is, the higher the cost. Additionally, either the heater is set on the roof or on the balcony, it will deface the general appearance of the buildings.

Secondly, the cost of solar power photovoltaic generation is extremely high, but its efficiency is too low.

Thirdly, the cost of buildings-insulation is high, but the heat is simply insulated without utilization.

Finally, recovery and utilization of rainwater is rarely applied to buildings, except to some conceptual architecture, for the reason that considerable capital needs to be invested to build a set of system, although the cost of the system is not high, its cost performance is too low relative to its function.

SUMMARY OF THE INVENTION

In view of disadvantages of the above four separate means for energy-conservation and utilization of solar energy, such as single-function, high cost and damage to the general appearance of the buildings and so on, the present invention is aimed at providing a solar energy collector with comprehensive effects, so as to improve the comprehensive effects and the cost performance of solar energy collectors and to broaden their applications.

The object of the present invention is achieved by the following technical scheme:

A solar energy collector with comprehensive effects, which is mounted on a mounting surface of a building or ground, comprises: an external controller; a support frame disposed on the mounting surface; an energy collecting unit comprising a pipeline system disposed on underside of the support frame, and modularized energy collecting boards with functions of solar power photovoltaic generation and heating water with solar energy, which are disposed on the upper-side of the support frame; a water collecting unit comprising a modularized water collecting slot, a water collecting pipe and a water collecting tank which are disposed under or beside the support frame; and an energy store unit comprising an insulation water tank and an electrical energy store system.

Preferably, according to the solar energy collector with comprehensive effects above, the support frame is a combinable grid architecture; the modularized energy collecting boards are disposed in the support frame; and a number of fastening legs extend integrally from the support frame, facing the mounting surface, for fixing the support frame on the mounting surface.

Preferably, according to the solar energy collector with comprehensive effects above, the modularized energy collecting board is a hollow and multilayer panel. From top to bottom, the first layer of the hollow and multilayer panel is an upper plate which is made of glass or plastic or other material with light transmission property; the second layer is polycrystalline silicon solar cells or monocrystalline silicon solar cells; the third layer is made of glass or plastic or other material with light transmission property, or metal with thermal conductivity; the fourth is used for transferring water or other liquid; the fifth layer is a lower plate which is made of glass or plastic or other material with heat resistant property; the sixth layer is a thermal insulating layer formed by heat insulating material or heat insulating construction.

The second layer is formed between the first layer and the third layer by sticking peripheries of the first layer and the third layer together with heat insulation sealing strip. The fourth layer is formed between the third layer and the fifth layer by sticking peripheries of the third layer and the fifth layer together with heat insulation sealing strip. The fifth layer and the sixth layer may be stuck together by sticking peripheries or sticking surfaces of them.

The first layer is used for transmitting light and protection. The sunlight is transmitted by the first layer, and then irradiates the second layer, the solar cells, to perform the function of solar power photovoltaic generation. At the same time, the remaining energy after photovoltaic generation is converted into heat partly except that some is reflected and some of the sunlight is transmitted to the fourth layer through the third layer. The heat and the sunlight transmitted to the fourth layer will heat the water or other liquid in the fourth layer to perform the function of water heating by solar energy. The fifth layer is used for seal and thermal insulation. The sixth layer is used for further thermal insulation and for supporting the module.

In specific implementing of the solar energy collector, its performance can be improved by taking further measures. For example, the air in the second layer can be drawn out to improve thermal insulation effects and thermal efficiency of the second layer. Or a surface of the fifth layer facing the fourth layer may be provided with a coating to absorb the heat. What's more, the structure of the module may be simplified to reduce the cost. For example, cancel the first layer, the second layer and the sixth layer and strengthen the third layer and the fifth layer. In this way, the solar energy collector has no effects of solar power photovoltaic generation and insulation, but its cost is reduced greatly and it is more appropriate for common customers. Keeping the sixth layer may make the thermal efficiency be improved based on the low cost.

Preferably, according to the solar energy collector with comprehensive effects above, the pipeline system is disposed inside the support frame and comprises a main water-outlet pipe, a main water-inlet pipe and several branch pipes; the two main pipes are connected with a water-inlet pipe and a water-outlet pipe of the insulation water tank respectively; water-intake pipes and water-outtake pipes of the modularized energy collecting boards are connected with corresponding branch pipes; the modularized energy collecting boards are connected in parallel or series between the two main pipes.

Preferably, according to the solar energy collector with comprehensive effects above, each of the water-intake pipes of the modularized energy collecting boards is provided with a pressure sensor and the main water-inlet pipe is provided with a magnetic valve; all pressure sensors and the magnetic valve are connected with the controller; the controller receives the signals of the pressure sensors, inspects whether any one of the modularized energy collecting boards leaks or not, and drives the corresponding magnetic valve to open or close.

Preferably, according to the solar energy collector with comprehensive effects above, the modularized water collecting slot comprises an impurity collector, a filter plate, a rainwater collecting board, a junction surface between the modularized water collecting slot and the support frame, a rainwater collecting hole and the water collecting pipe; the water collecting pipe is connected with the water collecting tank; and the filter plate is disposed aslant.

Preferably, the solar energy collector with comprehensive effects above is in the form of a horizontal structure or vertical structure.

The solar energy collector with comprehensive effects of the present invention has following advantages:

The integrated solar energy collector can realize four energy-conservation effects of solar power photovoltaic generation, water heating by solar energy, buildings insulation and rainwater collection. The collector has striking comprehensive effects. What's more, the structure and technics of the present invention are simple and its cost is low. The present invention can be configured flexibly, and the comprehensive effects and its cost performance are improved greatly and its application is broadened widely.

The elements in the above figures are denoted as follows:
- 11~modularized energy collecting board, 11a~high-efficiency energy collecting board, 111~upper plate, 112~lower plate, 113~hollow interlayer, 114~photovoltaic cell, 115~heat insulation sealing strip, 116~water-intake pipe and water-outtake pipe of energy collecting board, 117~thermal insulating layer, 12~pipeline system, 121~main water-outlet pipe, 122~main water-inlet pipe, 123~branch water-outlet pipe, 124~branch water-inlet pipe, 125~magnetic valve, 126~output of pressure sensor, 13~support frame, 131~fastening legs;
- 21~windshield, 22~air opening;
- 31~modularized water collecting slot, 311~impurity collector, 312~filter plate, 313~rainwater collecting board, 314~junction surface between the water collecting slot and the support frame, 315~rainwater collecting hole, 32~water collecting pipe, 33~water collecting tank;
- 4~controller, 41~wireless communication interface, 42~wired communication interface;
- 5~mounting surface.

DETAILED DESCRIPTION OF THE PREFERRED EMBODIMENTS

Figure 1:
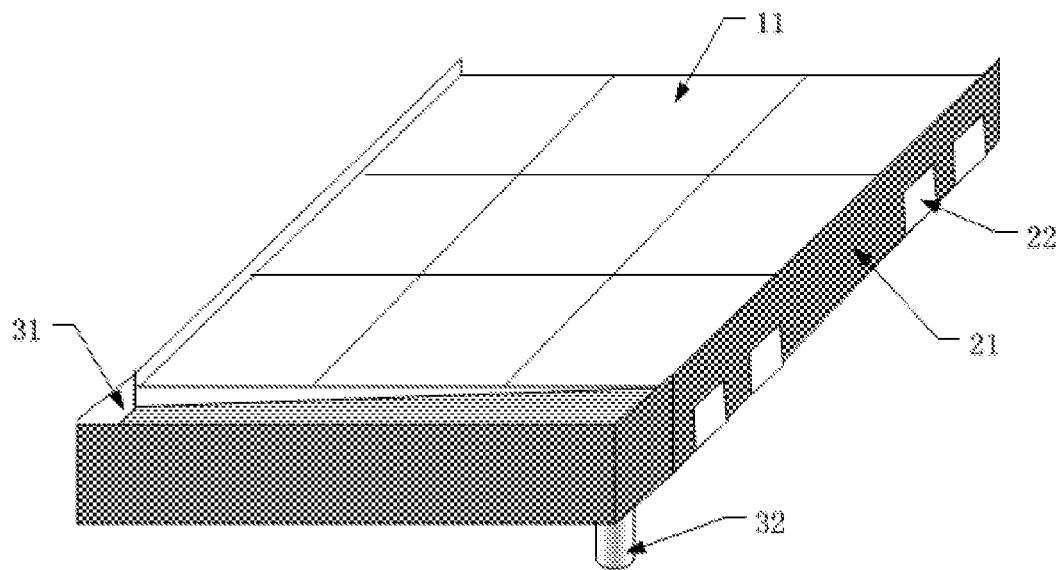
FIG. 1 is a stereogram illustrating a first preferred embodiment of the solar energy collector of the present invention.
Figure 3A:
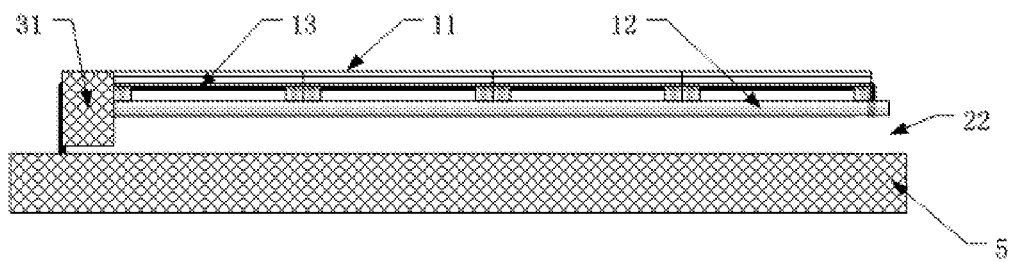
FIG. 3a is a sectional drawing illustrating the solar energy collector shown in FIG. 1, when windshields are not installed.
Figure 3B:
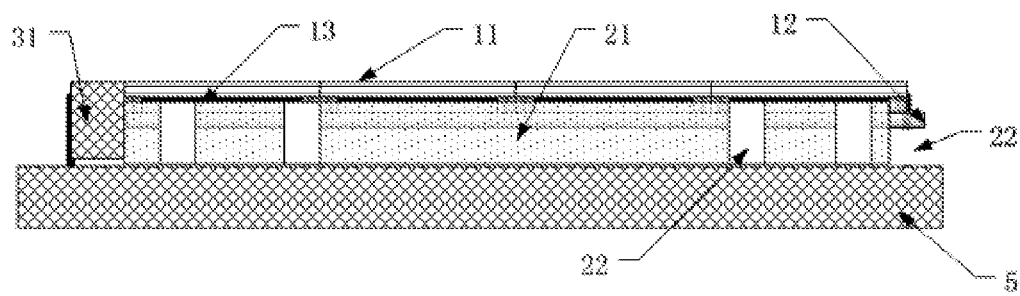
FIG. 3b is a sectional drawing illustrating the solar energy collector shown in FIG. 1, with windshields installed.

The solar energy collector with comprehensive effects of the present invention comprises an energy collecting unit and an energy storing unit from the view of energy utilization, and may further comprise a rainwater collecting unit and a heat insulation unit from the view of application. As shown in FIGS. 1, 3a and 3b, the solar energy collector is integrally installed on a mounting surface 5 of a building or the ground. Structure characteristic of the collector may be described as follows: a support frame 13 is disposed at a certain height above the mounting surface 5, and the support frame 13 is fixed on the mounting surface 5 with fastening legs 131; modularized energy collecting boards 11 and a pipeline system 12, which constitute the energy collecting unit of the solar energy collector, are respectively disposed on an upper-side and an lower-side of the support frame 13; windshields 21 with air openings 22 are disposed on the periphery between the underside of the support frame 13 and the mounting surface 5, which constitute the heat insulation unit of the solar energy collector. Additionally, for the application of the energy collecting unit, the solar energy collector further comprises a rainwater collecting unit, which are composed of a modularized water collecting slot 31, a water collecting pipe 32 and a water collecting tank 33 disposed beside or under the support frame 13; the solar energy collector further comprises an insulation water tank and an electrical energy store system (not shown in figures) for storing the energy collected. The energy collecting unit is fixed on the roof, the outside walls, the floor or other places of buildings with support frames. The modularized energy collecting board collects the solar energy to generate electricity and heat water, prevents direct sunlight to the roof or walls, and forms air current in internal air passages so as to take away the heat of the roof and outside walls of the buildings.

Functional units of the solar energy collector, including the energy collecting unit, the energy storing unit and the rainwater collecting unit, are integrally installed on the support frame, which is suspended over the mounting surface by means of the fastening legs of the support frame.

Figure 6:
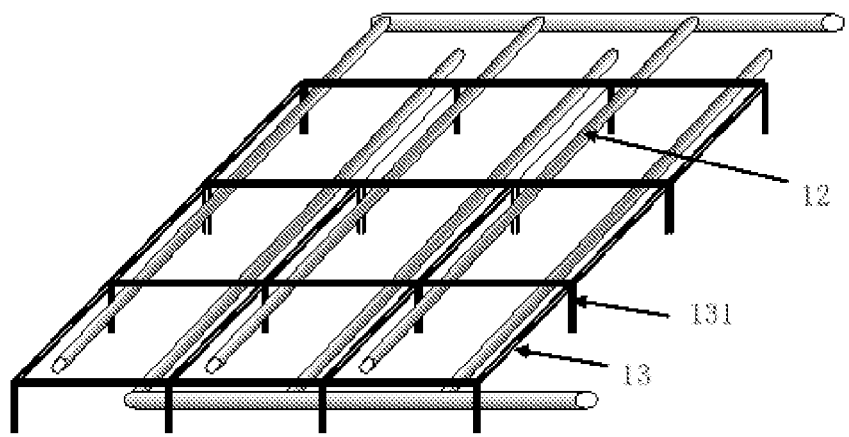
FIG. 6 is a schematic diagram illustrating the support frame and the pipe system of the solar energy collector shown in FIG. 1.

As shown in FIG. 6, the support frame 13 is a combinable grid architecture. The grids are provided with a number of fastening legs 131 for fixing the grids on the mounting surface 5. The installed area of the support frame 13 can be varied according to the actual situation. The pipeline system 12, composed of a main water-outlet pipe 121, a main water-inlet pipe 122, branch water-outlet pipes 123 and branch water-inlet pipes 124, is disposed inside the support frame 13. The modularized energy collecting boards 11 are laid or embedded in the upper-side of the support frame 13, optionally, the modularized water collecting slot 31 and the water collecting pipe 32 are provided. A certain distance is set between the support frame 13 and the mounting surface 5, which enables the air to flow between the support frame 13 and the mounting surface 5. Because the modularized energy collecting board 11 is disposed on the support frame 13, the mounting surface 5 is protected from direct sunlight. Additionally, the air flow inside the support frame 13 can accelerate heat dissipating from the mounting surface 5. The temperature of the mounting surface 5 can be reduced greatly by isolating the direct sunlight and accelerating the air flow. Additionally, the windshields 21 with air openings 22 disposed around the support frame 13 reduce the wind pressure below the support frame 13 and therefore the security is improved.

Figure 7A:
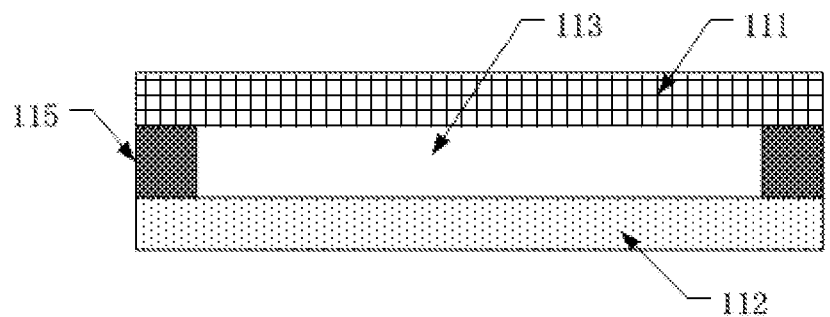
FIG. 7a is a sectional drawing illustrating the modularized energy collecting board without the effect of solar power photovoltaic generation in the present invention.
Figure 7B:
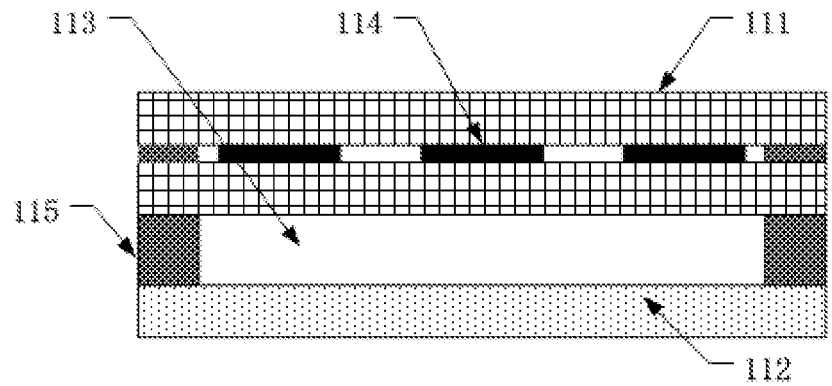
FIG. 7b is a sectional drawing illustrating the simplified structure of the modularized energy collecting board in the present invention.
Figure 7C:
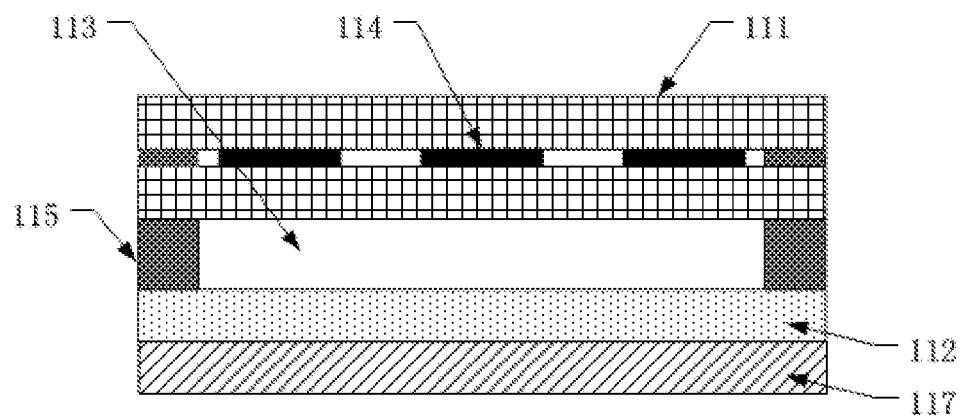
FIG. 7c is a sectional drawing illustrating the standard structure of the modularized energy collecting board in the present invention.
Figure 8:
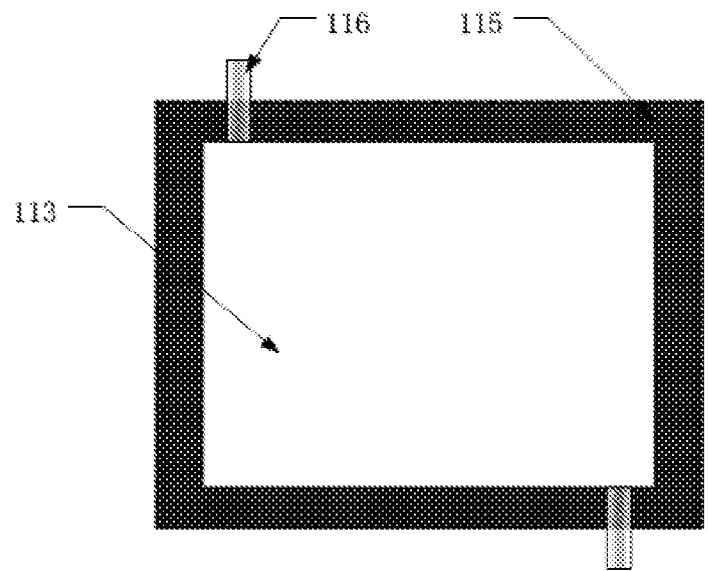
FIG. 8 is a horizontal section drawing illustrating the hollow interlayer of the modularized energy collecting board in the present invention.

FIGS. 7a to 7c illustrate sectional drawings of several feasible structures of the modularized energy collecting board of the present invention. As shown in these figures, the modularized energy collecting board 11 is a hollow and multilayer panel; the lower plate 112 of the multilayer panel is made of plastic, glass or other material; the upper plate 111 is made with solar power photovoltaic cells 114. The upper plate and the lower plate are stuck together at their peripheries with heat insulation sealing strips 115, and a hollow interlayer 113 is formed therebetween. As shown in FIG. 8, the hollow interlayer 113 of the energy collecting board is provided with a water-intake pipe and a water-outtake pipe 116 in two opposite directions respectively, the pipes 116 pass through the hollow interlayer 113, one end of the pipes 116 communicates with the pipeline system, another end of the pipes 116 passes through the heat insulation sealing strip 115 and communicates with the hollow interlayer 113. Alternatively, the upper plate 111 is not a solar power photovoltaic plate, but is a glass plate, metal plate or other material with good light transmission performance or good thermal conductivity, and at least one solar power photovoltaic cell is embedded by means of an intermediate glass plate at an upper-side of the hollow interlayer and below the upper plate of the energy collecting board. In this case, functions can be achieved without being influenced, and the cost performance of the solar energy collector is higher. Furthermore, in the modularized energy collecting board 11 as shown in FIG. 7c, a thermal insulating layer 117 is affixed at the bottom of the lower plate 112 so that heat collecting and heat retaining are performed more effectively.

In the solar energy collector with comprehensive effects, the number of the energy collecting boards with or without the function of photovoltaic generation may be configured at random to meet various demands. When the solar energy collector is provided with the energy collecting board with the function of photovoltaic generation, a photovoltaic generation system is constructed. With regard to the aspect of photovoltaic generation, the solar energy collector of the present invention improves the efficiency of comprehensive utilization of the solar energy and the cost performance of the system. Excluding the structure of the photovoltaic module, the remaining structure of the photovoltaic generation system, such as the connection of the solar power photovoltaic plates, the electrical energy storing, transform and output, does not belong to the innovation points of the present invention, and can be realized by photovoltaic generation technology in the prior art.

FIGS. 9a to 9d are schematic diagrams illustrating several connection forms of the pipe system of the present invention. The pipe system, which is disposed inside the support frame, comprises the main water-inlet pipe 122, the main water-outlet pipe 121, several branch water-inlet pipes 124, branch water-outlet pipes 123, and the water-intake pipe and the water-outtake pipe 116 of the modularized energy collecting boards. Two main pipes are connected with a water-inlet pipe and a water-outlet pipe of the insulation water tank respectively.

Figure 9A:
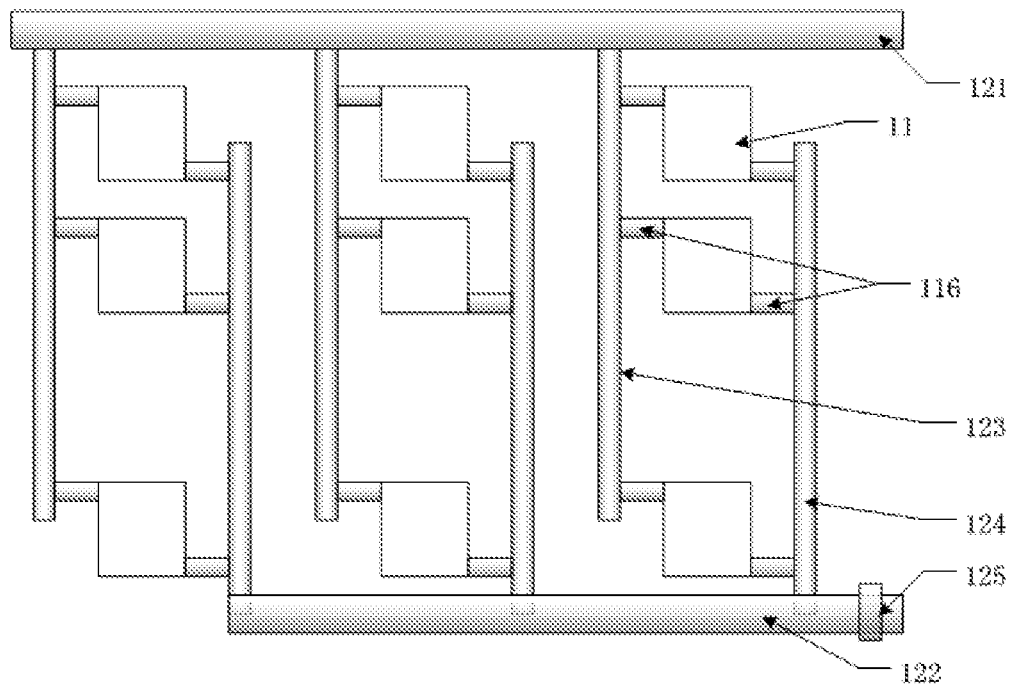
FIG. 9a is a schematic diagram illustrating the two-stage parallel pipe system in the present invention.
Figure 9B:
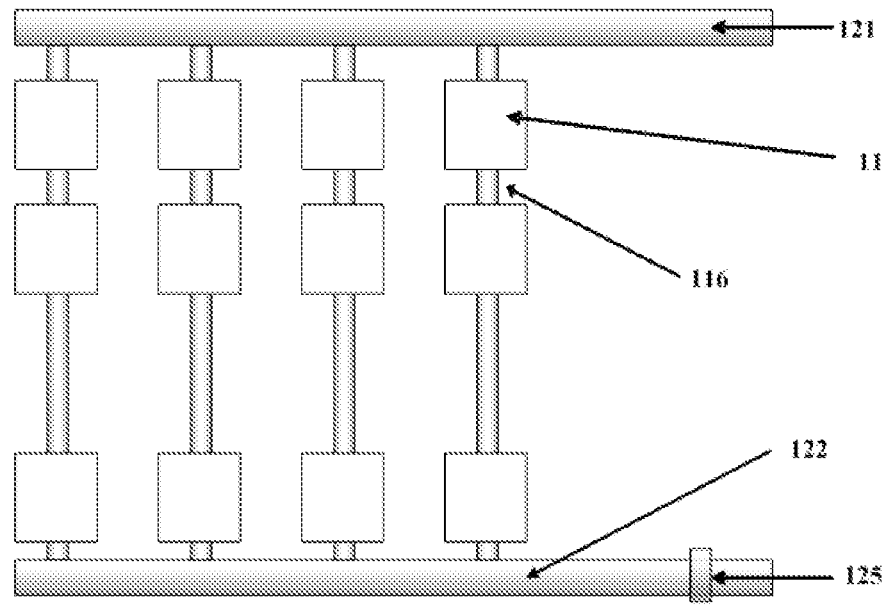
FIG. 9b is a schematic diagram illustrating the serial-parallel pipe system in the present invention.

As shown in FIG. 9a, the modularized energy collecting boards 11 are connected in two-stage parallel, while in FIG. 9b, they are connected in parallel and series. These two kinds of configurations are applied according to different operating requirements. The configuration shown in FIG. 9a has better reliability, but the configuration shown in FIG. 9b has a lower cost.

The heat collecting efficiency of the energy collecting board depends on its material and structure. In order to reduce the cost and improve the efficiency, there is another combined form of configuration for the pipe system.

Figure 9C:
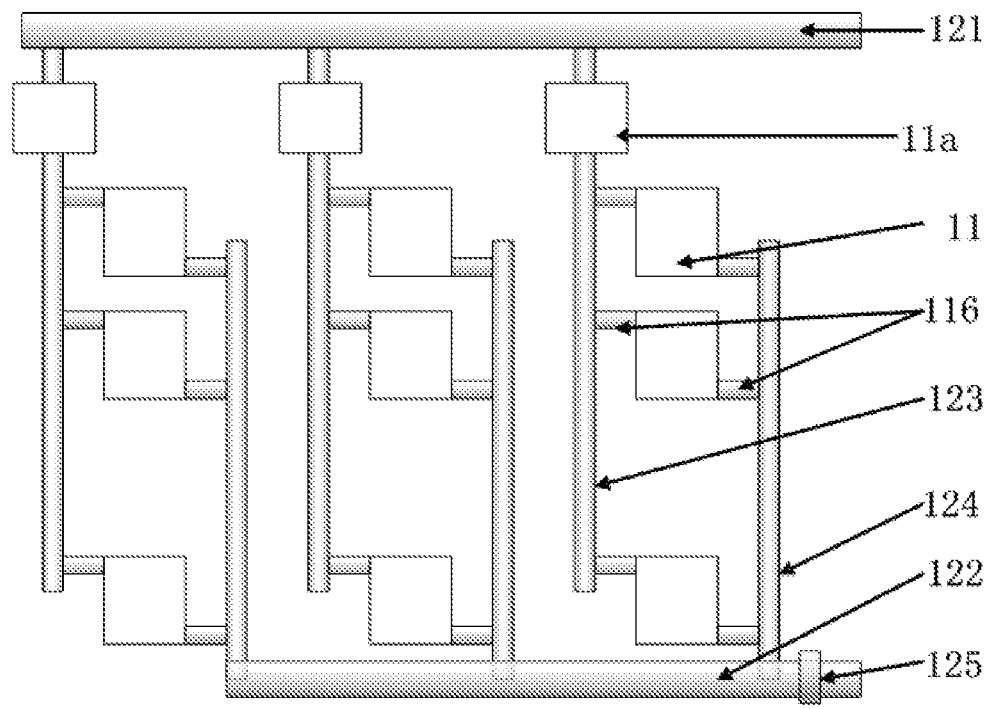
FIG. 9c is a schematic diagram illustrating the pipe system shown in FIG. 9a, of which each parallel branch is in series with one high-efficiency energy collecting board.

As shown in FIG. 9c, each parallel branch of the second parallel structure of the pipe system is in series with one high-efficiency energy collecting board 11a. The high-efficiency energy collecting board may be in the form of any existing vacuum heat tubes, flat-plate heat collectors or heat pipe absorbers. The temperature of the water increases by a certain amount after the water is preheated by common energy collecting boards, and rises significantly after the water is heated by the high-efficiency energy collecting board. In this way, the whole cost performance can be improved greatly on the basis of the preheating by means of lots of common and low-cost energy collecting boards in combination with the heating by means of a few high-efficiency energy collecting boards with high cost and high performance.

Figure 9D:
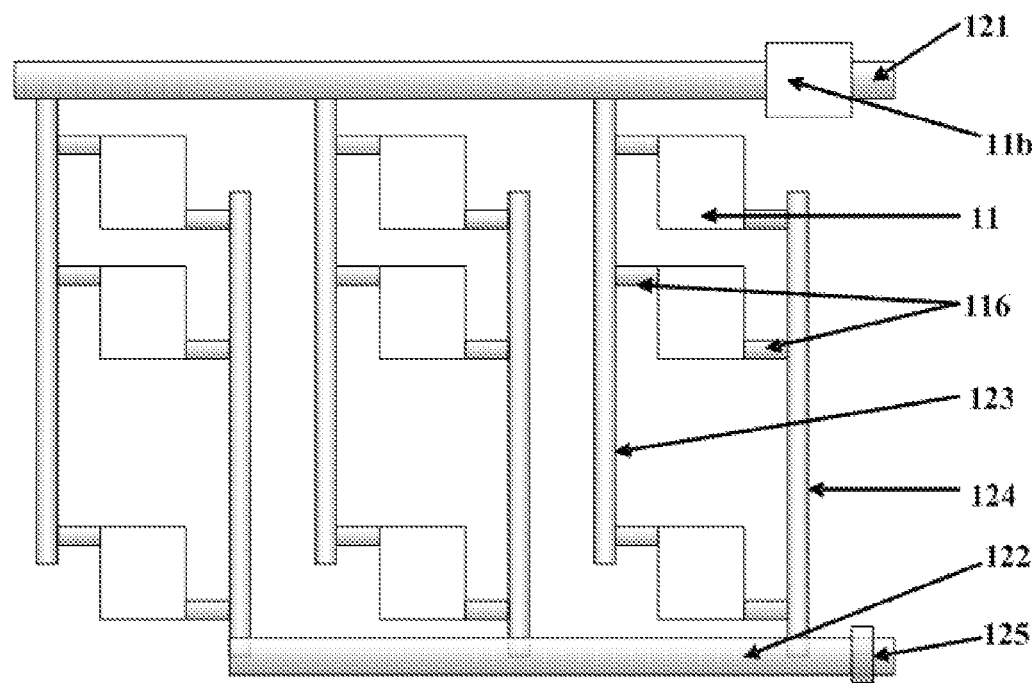
FIG. 9d is a schematic diagram illustrating the pipe system shown in FIG. 9a, of which the main pipe is in series with one high-efficiency energy collecting board.

The configuration in FIG. 9d is a simplification of the configuration in FIG. 9c. The high-efficiency energy collecting boards in parallel branches, as shown in 9c, are reduced to only one high-efficiency energy collecting board 11b being in series with the main water-outlet pipe, which simplifies the structure and reduces the cost, and the object of preheating and efficient temperature rising is also achieved.

In the four kinds of pipe systems, the front end of the main water-inlets pipe 122 is provided with a magnetic valve 125, which is connected with a controller. When any functional unit of the solar energy collector leaks or is destroyed, the controller will control and stop the water supply and give an alarm.

Figure 10:
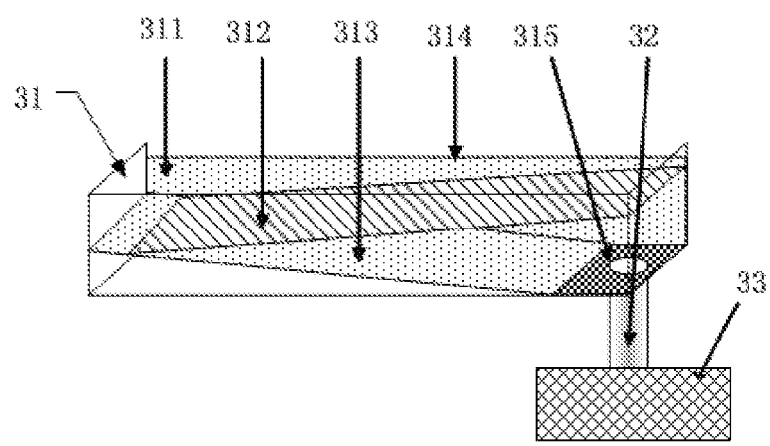
FIG. 10 is a schematic diagram illustrating the modularized water collecting slot in the present invention.

FIG. 10 is a schematic diagram illustrating the modularized water collecting slot of the present invention. The rainwater from a junction surface 314 between the modularized water collecting slot and the support frame runs to the modularized water collecting slot 31. A filter plate 312 is disposed inside the modularized water collecting slot 31 transversely and slightly aslant. A rainwater collecting board 313 is disposed under the filter plate aslant in an opposite direction. Bottom end of the filter plate 312 keeps a certain distance away from the shell of the modularized water collecting slot 31 on a first side and connects with the rainwater collecting board 313, which forms a groove, namely an impurity collector 311. Bottom end of the rainwater collecting board 313 also keeps a certain distance away from the shell of the modularized water collecting slot 31 on a second side and connects with the bottom of the modularized water collecting slot 31. A rainwater collecting hole 315 is disposed at the bottom of the modularized water collecting slot 31 and near the bottom end of the rainwater collecting board 313. The water collecting pipe 32 goes through the rainwater collecting hole, and pipe orifice of the water collecting pipe 32 keeps as high as or a little lower than the inner surface of the bottom of the modularized water collecting slot 315.

The rainwater from the modularized solar energy collecting boards runs to the filter plate of the modularized water collecting slot, then to the rainwater collecting board 313 and last to the water collecting pipe. Impurities with large volumes in the rainwater remain on the filter plate and drop to the impurity collector gradually along with the water flow. The modularized water collecting slot with simple structure filtrate and collect the rainwater at a lower cost, and can meet different filtrating requirements of different impurities by choosing different filter plates. The slant filter plate of the modularized water collecting slot can prevent meshes of the filter plate from being blocked and make it easy to clear up the impurities and clean the whole module.

The energy collecting unit may be provided with the modularized water collecting slot, which is disposed under the support frame. The windshields at two sides of the support frame are a little higher than the level of the modularized energy collecting board, so the rainwater will not overflow from the two sides of the support frame, but run down the support frame until come to the modularized water collecting slot. The modularized water collecting slot can filter the impurities with large volume out and prevent itself from being blocked. The rainwater is filtrated quickly and runs out from the water collecting pipe. The rainwater collected from the water collecting pipe may be filtrated further and stored or may be stored directly.

Figure 4:
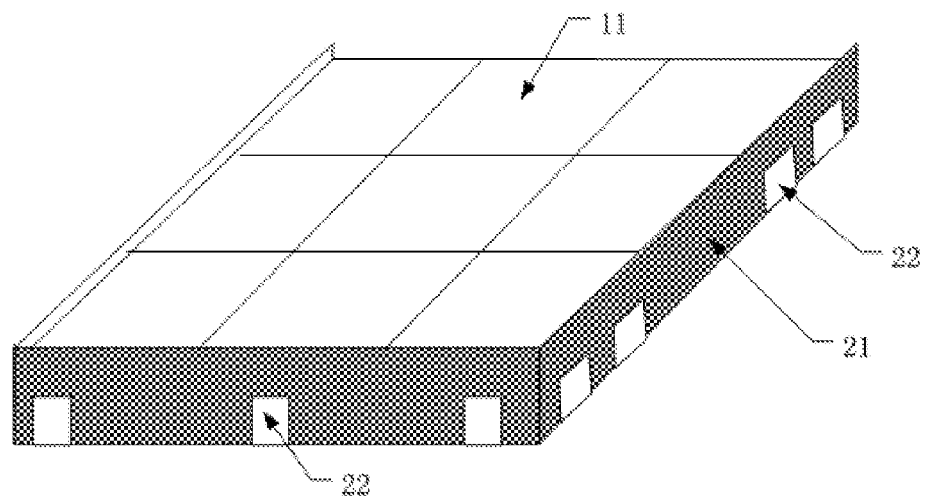
FIG. 4 is a stereogram illustrating the solar energy collector shown in FIG. 1, when the modularized water collecting slot is not installed.
Figure 5A:
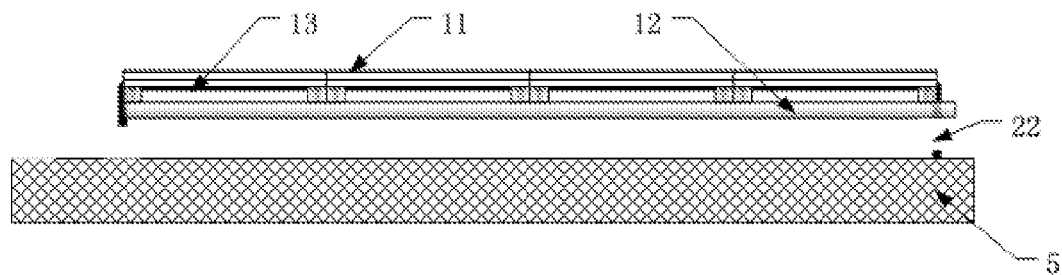
FIG. 5a is a sectional drawing illustrating the solar energy collector shown in FIG. 4, when windshields are not installed.
Figure 5B:
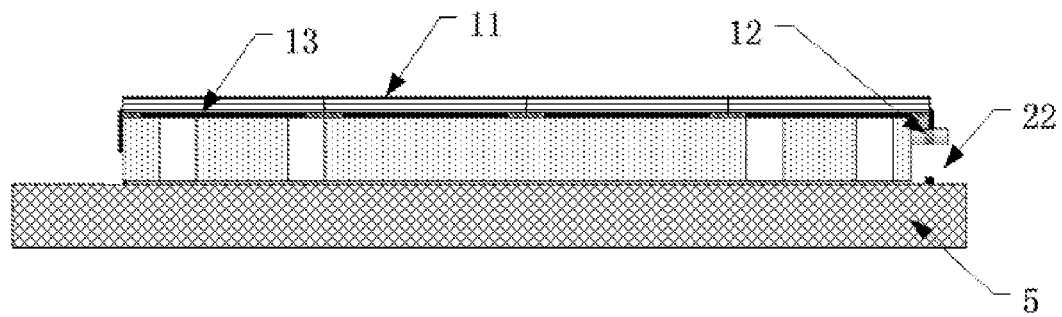
FIG. 5b is a sectional drawing illustrating the solar energy collector shown in FIG. 4, with windshields installed.

FIG. 4 is a stereogram illustrating the solar energy collector shown in FIG. 1, when the modularized water collecting slot is not installed; FIG. 5a is a sectional drawing illustrating the solar energy collector shown in FIG. 4, when windshields are not installed; FIG. 5b is a sectional drawing illustrating the solar energy collector shown in FIG. 4, with windshields installed. As shown in FIGS. 4, 5a and 5b, the solar energy collector is not installed with the modularized water collecting slot, although the solar energy collector has no function of collecting the rainwater, the other three kinds of functions will be achieved without any influences. It is still a typical solar energy collector with comprehensive effects.

Figure 2:
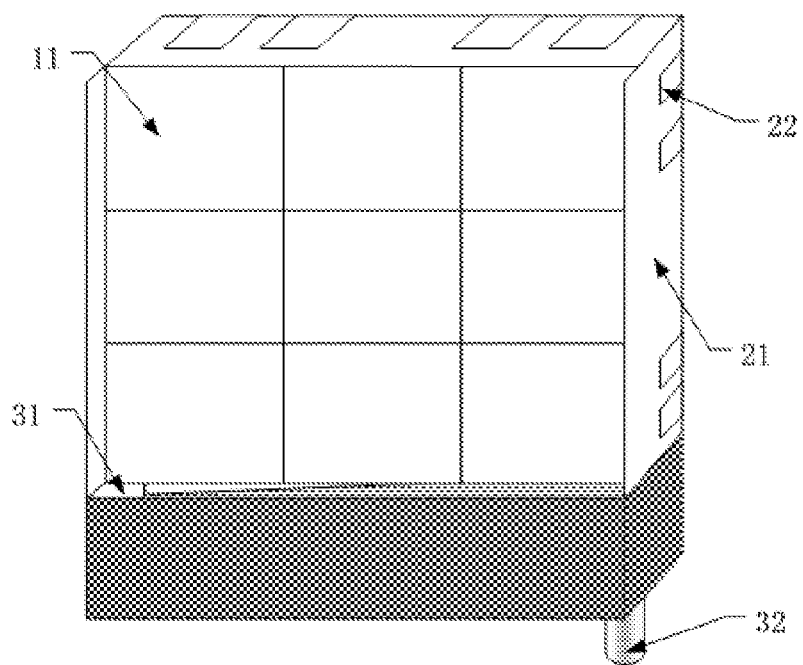
FIG. 2 is a stereogram illustrating a second embodiment of the solar energy collector of the present invention.

As shown in FIG. 2, according to different requirements (e.g. application in vertical wall), the solar energy collector of the present invention may be in the form of a vertical structure, which is different from the embodiment shown in FIG. 1. The whole solar energy collector is designed to be able to cling to the wall vertically or stand on the ground vertically, and is provided with the water collecting slot 31 on the downside of the support frame.

Figure 11:
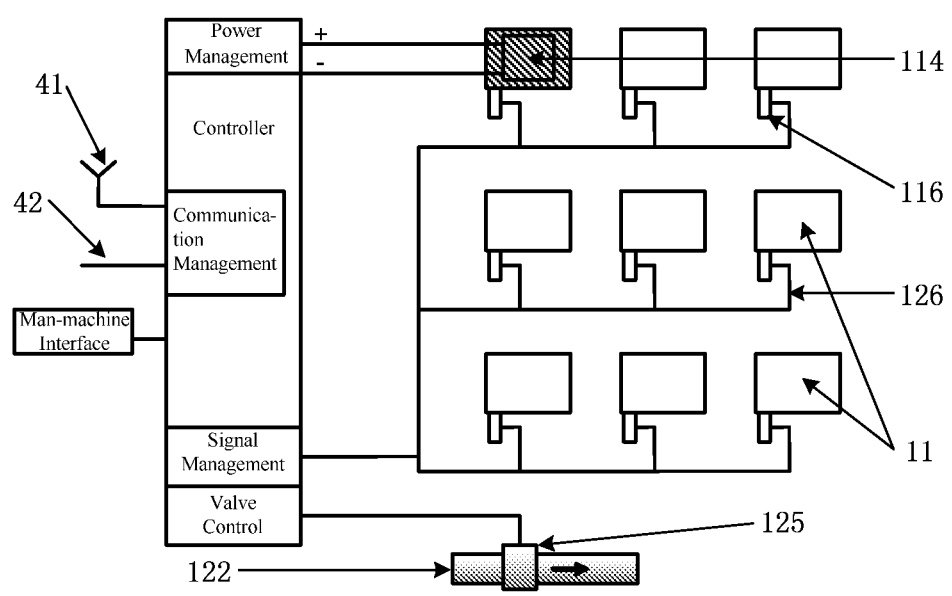
FIG. 11 is an electrical principle chart of the solar energy collector of the present invention.

FIG. 11 is an electrical principle chart of the solar energy collector of the present invention. Besides conventional functional units, the solar energy collector further comprises a controller, which monitors and controls all of the functional units and extends network with peripheral devices. The controller 4 mainly comprises a power management unit, a communication management unit, a safety signal management unit and a valve control unit.

Each water-intake pipe of the modularized energy collecting board of the solar energy collector is provided with a pressure sensor. Outputs 126 of all pressure sensors are sent to the safety signal management unit of the controller 4 through wires. When any modularized energy collecting board is destroyed and leaks, water pressure in the module will drop. Pressure signal measured by the pressure sensor is sent to the controller, and the valve control unit drives the magnetic valve 125 disposed on the main water-inlet pipe 122 to close and gives an alarm.

The communication management unit of the controller 4 comprises external interfaces, such as a wireless communication interface 41, a wired communication interface 42, a man-machine interface, and so on. The solar energy collector may be monitored by external systems through the interfaces, and on the other hand, it becomes easy to construct networks of the solar energy collectors on a large scale.

The power management unit of the controller is connected with the electrical energy store system directly, so that it can realize real-time monitoring of the electric energy converted by the solar energy collector.

From the above, integrate design of all functional units of the solar energy collector with comprehensive effects, whether it is horizontal or vertical, provides four kinds of technologies of new energy utilization and environment protection: solar power photovoltaic generation, water heating by solar energy, buildings insulation and rainwater collection. What's more, the solar energy collector is low cost and has high cost performance. The solar energy collector has a modular construction, and can perform function configuration and power configuration according to different requirements.

What is claimed is:

1. A solar energy collector for mounting on a mounting surface of a building or ground, comprising:
    an external controller;
    a support frame disposed on the mounting surface;
    an energy collecting unit, comprising a pipeline system disposed on an underside of the support frame, modularized energy collecting boards with functions of solar power photovoltaic generation and heating water with solar energy, wherein the modularized energy collecting boards are disposed on an upper-side of the support frame;
    a water collecting unit, which is disposed on the support frame and over the mounting surface, comprising a modularized water collecting slot, a water collecting pipe extending from the water modularized collecting slot, and a water collecting tank connected to the water collecting pipe disposed under or beside the support frame; wherein the modularized water collecting slot is connected to the modularized energy collecting boards at a junction surface of the support frame; a filter plate is disposed inside the modularized water collecting slot transversely and aslant; a rainwater collecting board is disposed under the filter plate aslant in an opposite direction; a bottom end of the filter plate is spaced a distance away from a first side of the modularized water collecting slot and connects with the rainwater collecting board, which forms an impurity collector; a bottom end of the rainwater collecting board is spaced a distance away from a second side of the modularized water collecting slot and connects with a bottom of the modularized water collecting slot;

windshields provided with air openings therein, wherein the windshields are provided vertically to the mounting surface and higher than a level of the modularized energy collecting boards, and the windshields are disposed on a periphery between the underside of the support frame and the mounting surface for reducing wind pressure below the support frame and directing water to the water collecting unit; and an energy store unit, comprising an insulation water tank and an electrical energy store system.

2. The solar energy collector according to claim 1, wherein, the support frame is a combinable grid architecture; the modularized energy collecting boards are disposed in the support frame; and a number of fastening legs extend integrally from the support frame, facing the mounting surface, for fixing the support frame on the mounting surface.

3. The solar energy collector according to claim 1, wherein, the modularized energy collecting board comprises a hollow and multilayer panel;

wherein the multilayer panel comprises:
- a lower plate in the form of a planar basement of plastic or glass;
- an upper plate in the form of a solar power photovoltaic plate, glass plate or thermal conductive metal plate; and
- a hollow interlayer between the upper plate and the lower plate formed by a heat insulation sealing strip disposed along peripheries of the upper plate and the lower plate.

4. The solar energy collector according to claim 3, wherein, at least one solar power photovoltaic cell is embedded by an intermediate glass plate at an upper-side of the hollow interlayer and below the upper plate of the modularized energy collecting board; and the modularized energy collecting board is connected to the electrical energy store system.

5. The solar energy collector according to claim 3, wherein, a thermal insulating layer is further disposed below the lower plate of the modularized energy collecting board.

6. The solar energy collector according to claim 3, wherein, the hollow interlayer of the modularized energy collecting board is provided with a water-intake pipe and a water-outtake pipe in two opposite directions respectively, the water-intake and water-outtake pipes pass through the hollow interlayer and communicate with the pipeline system.

7. The solar energy collector according to claim 1, wherein, the pipeline system is disposed inside the support frame and comprises a main water-outlet pipe, a main water-inlet pipe and several branch pipes;
- the main water-outlet pipes and the main water-inlet pipe are connected with a water-inlet pipe and a water-outlet pipe of the insulation water tank respectively;
- water-intake pipes and water-outtake pipes of the modularized energy collecting boards are connected with corresponding branch pipes; and
- the modularized energy collecting boards are connected in parallel or series between the main water-outlet and the main water-inlet pipes.

8. The solar energy collector according to claim 7, wherein, each of the water-intake pipes of the modularized energy collecting boards is provided with a pressure sensor and the main water-inlet pipe is provided with a magnetic valve; and all pressure sensors and the magnetic valve are connected with the external controller.

9. The solar energy collector according to claim 1, wherein, the modularized water collecting slot comprises:
- a rainwater collecting hole at a lower end of the rainwater collecting board; and wherein the water collecting pipe is connected between the rainwater collecting hole and the water collecting tank.

10. The solar energy collector according to claim 1, wherein, the solar energy collector is in the form of a horizontal structure or a vertical structure.

* * * * *